No. 699,289. Patented May 6, 1902.
C. F. CRADDICK & G. W. FARLIN, Jr.
PIPE AND FLUE CLEANER.
(Application filed Aug. 13, 1901.)
(No Model.)
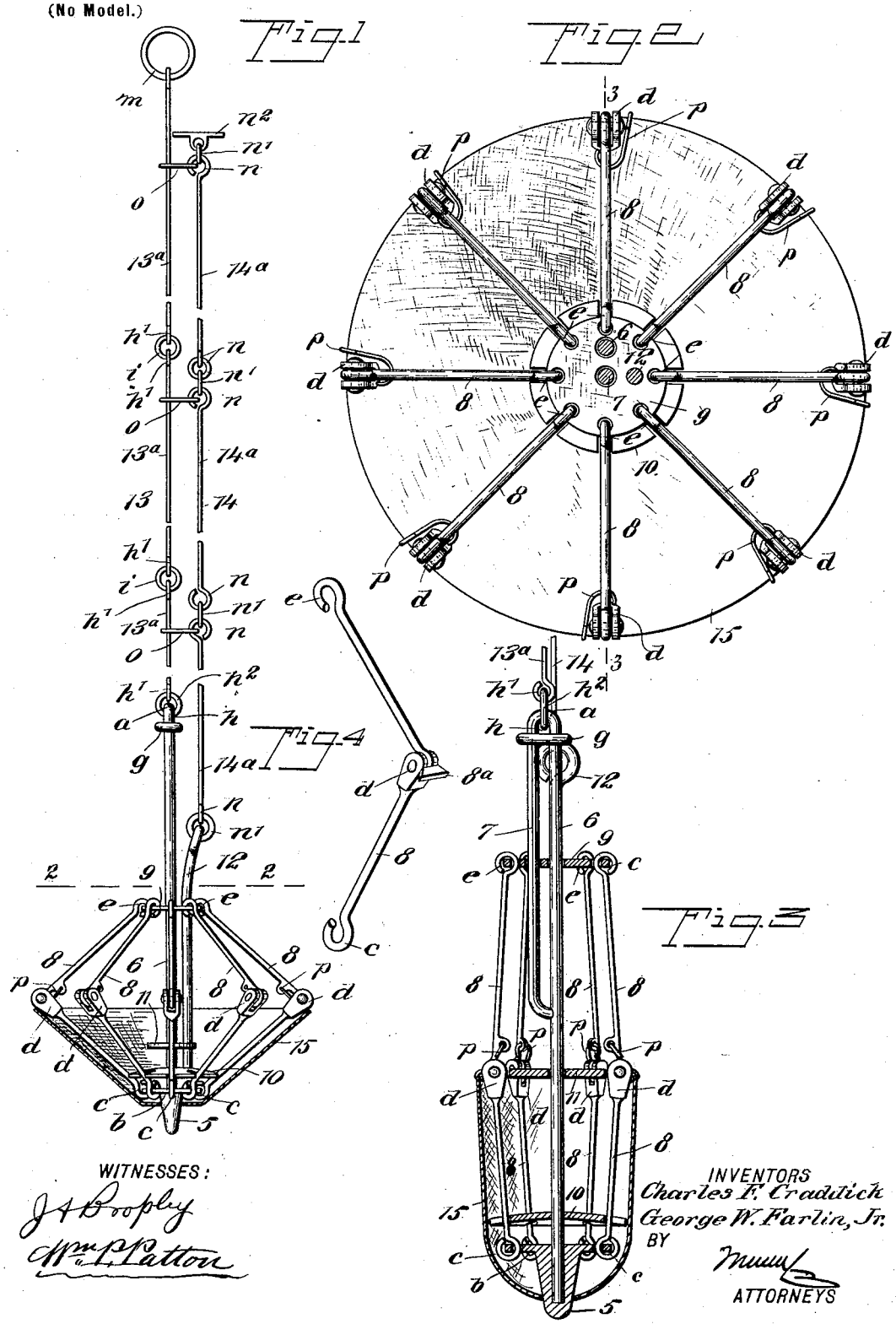
WITNESSES:
INVENTORS
Charles F. Craddick
George W. Farlin, Jr.
BY
ATTORNEYS

UNITED STATES PATENT OFFICE.

CHARLES FLORENCE CRADDICK AND GEORGE WILLIAM FARLIN, JR., OF BUTTE, MONTANA.

PIPE AND FLUE CLEANER.

SPECIFICATION forming part of Letters Patent No. 699,289, dated May 6, 1902.

Application filed August 13, 1901. Serial No. 71,890. (No model.)

*To all whom it may concern:*

Be it known that we, CHARLES FLORENCE CRADDICK and GEORGE WILLIAM FARLIN, Jr., citizens of the United States, and residents of Butte, in the county of Silverbow and State of Montana, have invented a new and Improved Pipe and Flue Cleaner, of which the following is a full, clear, and exact description.

The object of this invention is to provide a novel, simple, and practical device which is adapted for convenient use and affords effective means for the loosening and removal of soot accumulation from the interior of a stovepipe and also from the ordinary chimney-flue in a dwelling.

A further object is to afford an efficient implement for removing an obstruction from a sewer-pipe or the like.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional and broken side view of the improved implement, showing the scraper-frame distended. Fig. 2 is an enlarged partly-sectional plan view substantially on the line 2 2 in Fig. 1. Fig. 3 is a partly-sectional side view of novel details substantially on the line 3 3 in Fig. 2, but showing working parts in folded adjustment; and Fig. 4 is a detail view showing a part of the scraper-frame and a scraper-blade attached thereto.

The invention, in brief, comprises a laterally expansible and contractible scraper-frame and two elongated pusher-rods thereon, which are laterally flexible, but longitudinally rigid. The skeleton scraper-frame when in closed condition is adapted for free insertion into an opening in a stovepipe, chimney-flue, or a sewer-pipe and when expanded subsequently by manipulation of the pusher-rods at their ends serves, when reciprocated, to scrape and remove obstructions from the pipe or flue.

Referring to the drawings, 5 indicates a preferably coniform head-block for the scraper-frame. A guide-bar 6, formed of a wire rod, is secured by one end upon or in the head-block 5, so as to project therefrom, the free end portion of the guide-bar being return bent, as at $a$, affording a parallel guide member 7, which coacts with the guide-bar, as is hereinafter explained.

A radial flange $b$ is formed on the inner end of the head-block 5, and a series of spaced perforations is formed in said flange, wherein ring-eyes $c$, formed on like ends of the scraper-bars 8, are loosely secured. The scraper-bars 8 may be of any suitable number, eight being shown in the drawings, and these similar members of the scraper-frame have a hinge-joint $d$ at or near the longitudinal center of each bar.

Upon the guide-bar 6 and parallel guide member 7 a slide-plate 9, having a preferably circular periphery, is loosely mounted, which plate may reciprocate on the bar 6 and guide member 7 a distance substantially equal to the length of the guide member 7. Near the periphery of the slide-plate 9 a series of spaced perforations is formed, equal in number to the perforations in the radial flange $b$, and hooks $e$ on adjacent ends of the scraper-bars 8 are loosely engaged within the perforations in the slide-plate.

A reinforce-plate 10 is secured upon the guide-bar 6 above and near the inner end of the head-block 5, and the scraper-bars 8, which have a loose engagement in radial slots formed in the plate 10, are thereby held from a sidewise movement in either direction.

A guide-plate 11 is loosely mounted upon the guide-bar 6 intermediately of the lower end of the guide member 7 and the reinforcing-plate 10, and upon said guide-plate the lower end of the connecting-rod 12 is fixed, said rod passing loosely up through the slide-plate 9 and above the same a proper distance for effective service. Upon the upper end of the guide-bar 6, near the bend thereon, a transverse spacing-ring $g$ is secured, affording an eye $h$ above it.

A laterally-flexible pusher-rod 13 of any preferred length is provided, one end of said rod having a loose coupled engagement with the eye $h$, preferably as shown, and consisting of a ring-eye $h'$, formed on the end of the rod, and a coupling-ring $h^2$, which is inserted in the eye $h$ and ring-eye $h'$, as shown in Figs. 1 and 2.

The pusher-rod 13 is composed of a series of elongated metal link-bars $13^a$, having ring-eyes $h'$ formed on their ends, and each adjacent pair of said integral ring-eyes have coupled engagement effected between them by a closed ring $i$, the free end of the pusher-rod 13 terminating in an enlarged handle-ring $m$, as shown in Fig. 1.

Another pusher-rod 14 is furnished for movement of the connecting-rod 12, and, in effect, is an extension thereof, and, as shown, the pusher-rod 14 is constructed of a series of elongated metal link-bars $14^a$, provided with integral ring-eyes $n$ on their ends, and said ring-eyes are coupled together in pairs by closed rings $n'$.

At suitable points keeper-rings $o$ are loosely secured in some of the ring-eyes $n$ and extend laterally therefrom to loosely engage the link-bars $13^a$, which engagement serves to hold the two pusher-rods properly connected, but free to receive independent adjustment, a handle-bar $n^2$, which is loosely connected with the free extremity of the pusher-rod 14, affording means for its convenient manipulation.

It will be seen that if the handle-ring $m$ is grasped with one hand and the handle-bar $n'$ with the other hand the operator, pulling upon the ring and pushing the bar, will spread the joints $d$ of all the scraper-arms 8 if the scraper-frame is in closed condition, a reverse movement of said parts obviously effecting a closure of the joints. A pliable shield 15, formed of any suitable material, is held upon the expansible scraper-frame, preferably by the means shown, consisting in rendering the edge of the shield circular and centrally perforating it, so as to adapt it for location upon the coniform body of the head-block 5.

Hooks $p$ are secured at proper intervals upon the shield, at or near its edge, and said hooks have hooked engagement within the eyes that are formed on the upper members of the scraper-bars 8.

To render the device effective for the removal of soot which is compact and is hard to detach from the interior of a stovepipe or chimney-flue or for the scraping of the interior of a sewer-pipe, we have shown in Fig. 4 a scraper attachment $8^a$ for each flexing scraper-bar 8.

The scraper-blade $8^a$ is extended transversely of the bar 8 and at its center of length is secured upon the joint $d$ thereof in a manner which will permit the free flexure of the joint. The set of scraper-blades are to be of similar form; but it is to be understood that the scraping edges thereof may be convex-curved a suitable degree or be straight, if this is essential.

In service the scraper-frame is contracted to its smallest dimensions when it is to be introduced into the aperture in the side of a stovepipe ordinarily provided to control draft and permit the escape from the room of the odor of cooking, said aperture being graduated in area or entirely closed by a slidable gate, as occasion may require; but as the device is not a feature of the invention it is omitted from the drawings.

The scraper-frame is contracted laterally, as shown in Fig. 3, when it is to be introduced into a stovepipe-opening, this being effected by the manipulation of the pusher-rods 13 14, so as to adjust them endwise in opposite directions, as before explained, and the contracted scraper-frame is then pushed into and upward within the stovepipe by gripping and pushing both rods 13 14 together.

As soon as the scraper-frame is properly inserted in the pipe so as to head upwardly the pusher-rods 13 14 are adjusted oppositely and the scraper-frame is expanded, causing the blades $8^a$ to impinge upon the inner surface of the stovepipe.

If desired, the improved scraper device may be introduced within a rectangular chimney-flue through an opening in its lower portion and be reciprocated therein for the removal of soot therefrom, the scraper-frame for such a purpose having scraper-blades thereon that are straight on their cutting edges.

It will be seen that the flexible shield 15 when in place on the scraper-frame facilitates the removal of loose soot from the stovepipe, which will be pushed therewith, so as to pass into the chimney-flue, and it is found in practice that if the air is rarefied in said flue by having a small fire in the stove the upward draft of the flue will be sufficient to carry with the upward current of hot air such loose soot as is introduced therein from the stovepipe during the cleaning of the latter.

Having thus described our invention, we claim as new and desire to secure by Letters Patent—

1. The combination with a scraper-frame having arms that are jointed between their ends, of pusher-rods connected with the scraper-frame and adapted to flex laterally but not longitudinally.

2. The combination with elongated pusher-rods independent of each other, and longitudinally unyielding but laterally flexible, of a scraper-frame formed of a plurality of jointed arms, laterally flexed by the manipulation of the pusher-rods in opposite directions, for the expansion or contraction of the scraper-frame.

3. The combination with a scraper-frame, comprising a plurality of arms having elbow-joints, scraper-blades on said arms at the elbow-joints, and means for assembling the arms so as to simultaneously adjust them for the expansion and contraction of the scraper-frame, of laterally-yielding but longitudinally-unyielding pusher-rods, joined by one end of each upon the scraper-frame, so as to receive either independent or simultaneous longitudinal movement.

4. The combination with an expansible and contractible scraper-frame, comprising a plurality of arms held to rock at their ends, and having elbow-joints between their ends, said arms also having eye-holes therein near the elbow-joints, of a flexible shield adapted to envelop the lower portion of the scraper-frame, and hooks on the shield near its edge, which may engage with the eye-holes in the arms to secure the shield upon the scraper-frame.

In testimony whereof we have signed our names to this specification in the presence of two subscribing witnesses.

CHARLES FLORENCE CRADDICK.
   GEORGE WILLIAM FARLIN, JR.

Witnesses:
 C. P. DRENNEN,
 JOHN A. SMITH.